United States Patent
Pandharipande et al.

(10) Patent No.: US 10,701,782 B2
(45) Date of Patent: Jun. 30, 2020

(54) VERIFICATION DEVICE FOR A CONNECTED LIGHTING SYSTEM

(71) Applicant: SIGNIFY HOLDING B.V., Eindhoven (NL)

(72) Inventors: Ashish Vijay Pandharipande, Eindhoven (NL); David Ricardo Caicedo Fernández, Eindhoven (NL); Maurice Ampt, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/315,752

(22) PCT Filed: Jun. 9, 2017

(86) PCT No.: PCT/EP2017/064135
§ 371 (c)(1),
(2) Date: Jan. 7, 2019

(87) PCT Pub. No.: WO2018/007099
PCT Pub. Date: Jan. 11, 2018

(65) Prior Publication Data
US 2019/0254144 A1    Aug. 15, 2019

(30) Foreign Application Priority Data
Jul. 5, 2016    (EP) .................................... 16177884

(51) Int. Cl.
*H05B 37/02* (2006.01)
*H05B 47/105* (2020.01)
(Continued)

(52) U.S. Cl.
CPC ......... *H05B 47/105* (2020.01); *H05B 47/155* (2020.01); *H05B 47/115* (2020.01); *H05B 47/16* (2020.01)

(58) Field of Classification Search
CPC .................... H05B 37/0245; H05B 47/105; H05B 47/115; H05B 47/16
(Continued)

(56) References Cited

U.S. PATENT DOCUMENTS 9,014,829 B2    4/2015    Chemel et al.
9,497,832 B2 *  11/2016   Verberkt ............ H05B 37/0227
(Continued)

FOREIGN PATENT DOCUMENTS

| EP | 2466995 B1 | 10/2015 |
| WO | WO2014097072 A1 | 6/2014 |
| WO | WO2015127491 A1 | 9/2015 |

*Primary Examiner* — Thuy V Tran
(74) *Attorney, Agent, or Firm* — Meenakshy Chakravorty

(57) ABSTRACT

A verification device to detect malfunction in a connected lighting system, the connected lighting system comprising multiple luminaires and multiple occupancy sensors, the verification device comprising: —an input interface (301) arranged to connect to a database and obtain the sensor data obtained from the multiple occupancy sensors, —an aggregation unit (310) arranged to compute occupancy values which are indicative of occupancy over a specified time period at different hierarchical levels by applying a statistical measure, and —a processing unit (320) arranged to compare an occupancy value at a lower hierarchical level with an occupancy value at a higher hierarchical level, finding deviations that indicate a malfunction in the connected lighting system and producing a signal to communicate the malfunction.

15 Claims, 7 Drawing Sheets

(51) Int. Cl.
  *H05B 47/155*  (2020.01)
  *H05B 47/115*  (2020.01)
  *H05B 47/16*   (2020.01)

(58) Field of Classification Search
  USPC .............................................. 340/540, 573.1
  See application file for complete search history.

(56) References Cited

U.S. PATENT DOCUMENTS

| | | | |
|---|---|---|---|
| 9,615,434 B2* | 4/2017 | Vangeel | G06F 8/654 |
| 9,730,298 B2* | 8/2017 | Vangeel | G06F 8/654 |
| 9,826,601 B2* | 11/2017 | Vangeel | G06F 8/654 |
| 9,986,624 B2* | 5/2018 | Vangeel | G06F 8/654 |
| 10,045,417 B2* | 8/2018 | Simonian | H05B 37/0227 |
| 10,117,314 B2* | 10/2018 | Vangeel | G06F 8/654 |
| 2012/0310376 A1 | 12/2012 | Krumm et al. | |
| 2013/0134886 A1 | 5/2013 | Golding et al. | |
| 2014/0239817 A1 | 8/2014 | Leinen et al. | |
| 2015/0177716 A1 | 6/2015 | Hyman et al. | |
| 2016/0061469 A1 | 3/2016 | Albonesi et al. | |
| 2016/0091217 A1* | 3/2016 | Verberkt | G06F 8/654 |
| | | | 700/276 |

* cited by examiner 221  1 1 0 0 1 1 0 0 1 1 0 0 0 0 1 1 0 0

VERIFICATION DEVICE FOR A CONNECTED LIGHTING SYSTEM

CROSS-REFERENCE TO PRIOR APPLICATIONS

This application is the U.S. National Phase application under 35 U.S.C. § 371 of International Application No. PCT/EP2017/064135, filed on Jun. 9, 2017, which claims the benefit of European Patent Application No. 16177884.0, filed on Jul. 5, 2016. These applications are hereby incorporated by reference herein.

FIELD OF THE INVENTION

The invention relates to a verification device, a verification method, a computer program.

BACKGROUND

Smart lighting systems with multiple luminaires and sensors are witnessing a steady growth. With growing penetration of such systems and as these systems become more connected, large amounts of data will become available at the backend or in the cloud, etc. Such data may be in the form of energy data, and occupancy data available from sensors.

As the size of such data increases, processing and visualizing it along with analyzing for patterns becomes a challenge. Simple ways to achieve this are needed so that an application analyst or facility manager may sift through data in order to derive insights quickly or identify problematic situations.

For example, U.S. Pat. No. 9,014,829 B2 discloses an occupancy sensing unit configured to monitor an environment illuminated by a lighting fixture. The occupancy sensing unit may include an occupancy sensor to detect radiation indicative of at least one occupancy event in the environment illuminated by the lighting fixture according to sensing parameters. The occupancy sensor can be coupled to a memory that logs sensor data, which represent the occupancy events, provided by the occupancy sensor.

There is a need for an improved system to perform an analysis of the sensor data logged in the memory.

Reference is made to European patent application 2466995, with title "Light timeout optimization".

SUMMARY OF THE INVENTION

In an embodiment, a verification device is arranged to detect malfunction in a connected lighting system, the connected lighting system comprising multiple luminaires and multiple occupancy sensors, the multiple luminaires being partitioned into control zones which are controlled in dependency on one or more corresponding occupancy sensors, the connected lighting system being organized according to a hierarchical structure wherein the multiple occupancy sensors are at the first hierarchical level, the control zones are at the second hierarchical level, the control zones being partitioned into sets which are at the third hierarchical level, the connected lighting system being connected to the database and is arranged to store sensor data obtained from the multiple occupancy sensors of the multiple luminaires, the verification device comprising:

an input interface arranged to connect to a database and obtain the sensor data obtained from the multiple occupancy sensors, an aggregation unit arranged to compute occupancy values which are indicative of occupancy over a specified time period at different hierarchical levels by applying a statistical measure, and a processing unit arranged to compare an occupancy value at a lower hierarchical level with an occupancy value at a higher hierarchical level, finding deviations that indicate a malfunction in the connected lighting system and producing a signal to communicate the malfunction.

Connected lighting systems may be a combination of multiple system elements such as sensors, lighting units, connectivity modules. The system reliability is a complex combination of individual sub-system reliabilities. Furthermore, there may be a large number of sub-systems, for example thousands of sensors and luminaires, in a connected lighting system. Accordingly, automated means to find malfunction in a connected lighting system is desirable.

A problem with automated verification is that occupancy sensors or luminaires do not have a universal standard with which to compare the data produced by the occupancy sensors or luminaires. For example, some buildings may be used for more hours a day than other buildings. Some rooms may be used more heavily than other rooms. A simple system in which the use of a room, or of a luminaire say is compared to a fixed number is likely to give a lot of false positives for a building in which personal happens to make longer hours, or false negatives for a building in which working days are shorter. In a verification device according to an embodiment, occupancy values are compared to each other across different hierarchical levels. By comparing occupancy values between different levels anomalies may be found, both in heavily used buildings and lightly used buildings.

For example, in an embodiment, the processing unit is arranged to find a control zone with multiple corresponding sensors (S1, S2), such that the occupancy value for the control zone is above the occupancy value at the third hierarchical level corresponding to the control zone, and a first of the sensors (S1) is at the occupancy value at the third hierarchical level and a second sensor is at or above the occupancy value for the control zone, the processing unit producing a signal that the second one of the sensors (S2) is malfunctioning.

A pattern such as this has been found to point to a malfunctioning sensor. The system may bring the malfunctioning sensor to the attention of an operator, who may then decide to investigate further or to replace the sensor. The verification device may also enable repairs, possibly temporally, which do not require the immediate replacement of the sensor but modify the control mapping between sensors and luminaires.

The verification device is an electronic device. The electronic device may be a mobile electronic device, e.g., a mobile phone, or a stationary computer, e.g., a desktop computer.

A method of verification according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a map of control zones and sensors, FIG. 2a schematically shows an example of an embodiment of a verification device and a connected light system, FIG. 2b schematically shows an example of an embodiment of control mapping, FIG. 2c schematically shows examples of embodiments of usage data, FIG. 2d schematically shows examples of embodiments of occupancy values, FIG. 3a schematically shows an example of an embodiment of computing occupancy values at different hierarchical levels by applying a statistical measure, FIG. 3b schematically shows an example of an embodiment of hierarchical levels, FIG. 4 schematically shows an example of an embodiment of a method of verification, FIG. 5a schematically shows a computer readable medium having a writable part comprising a computer program according to an embodiment, FIG. 5b schematically shows a representation of a processor system according to an embodiment.

LIST OF REFERENCE NUMERALS, IN FIGS. 1A-3B 100 a floor
110-115 a meeting room
120-129 an open plan
130 an office
140 a corridor
150 a color key
161-164 an occupancy sensor
161', 162' a luminaire
170 a back-end
172 a database
173 a digital network
175 a connected lighting system
201-203 an occupancy sensor
201'-203' a luminaire
215, 281 an occupancy value at the second hierarchical level
221, 222 occupancy sensor data
223-225 usage data
230 occupancy values at the second hierarchical level
261, 262 an occupancy value at the first hierarchical level
271-273 an occupancy value at the first hierarchical level
291 an occupancy value at the third hierarchical level
300 a verification device
301 an input interface
310 an aggregation unit
320 a processing unit

DETAILED DESCRIPTION OF PREFERRED EMBODIMENTS

Figure 1:
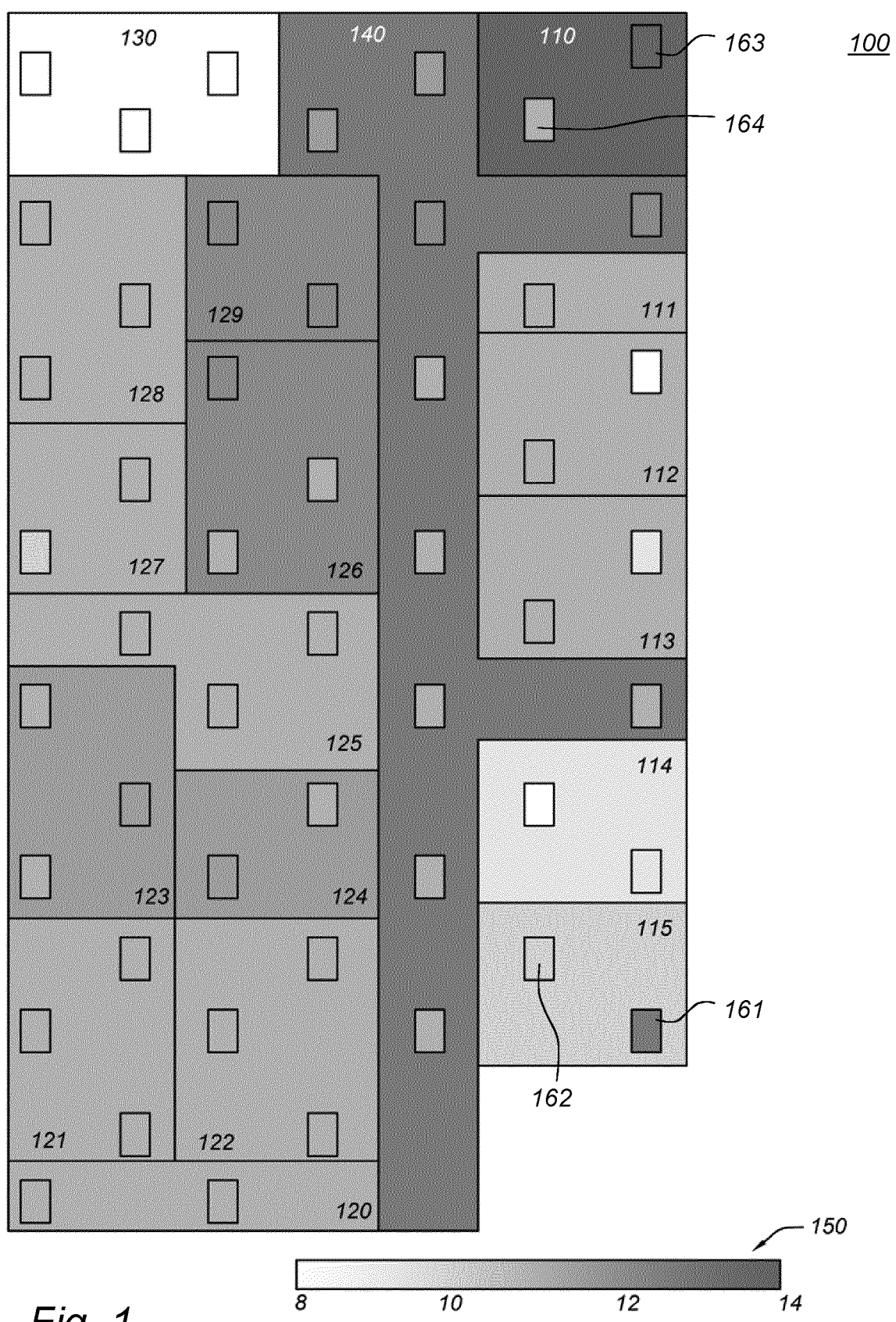

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1 schematically shows an example of a map of an embodiment of a floor 100 of a floor of a building.

The map of floor 100 shows a corridor 140, an office 130 and six meeting rooms 110-115. A large open plan office is shown in which multiple people can work. The open plan is indicated by reference numerals 120-129. Shown in floor 100 are multiple occupancy sensors, indicated as small rectangles. Some of the occupancy sensors are indicated with a reference numeral, see 161, 162, 163 and 164.

The connected light system illustrated by the map of FIG. 1 uses luminaires with integrated occupancy sensors. This means that in this case, the number of occupancy sensors and luminaires is the same. This is not needed, though. For example, in an embodiment, more or fewer occupancy sensors may be used in a control zone than there are luminaires. For example, additional occupancy sensors may be installed, e.g., in addition to the occupancy sensors integrated with the luminaires. For example, some additional luminaires may be installed without integrated occupancy sensors. When there is a need to distinguish between a luminaire and its occupancy sensor, we will add a hyphen to reference numeral, e.g., occupancy sensor 161 and luminaire 161'.

A connected lighting system is installed on this floor. The connected lighting system might extend to other floors in the building. In the connected lighting system luminaires are partitioned into control zones. Luminaires in the same control zones are controlled together, e.g., as a set. In an embodiment, all luminaires in a control zone are turned on or off, or dimmed together as a group. For example, all luminaires in office 130, say, are controlled together, for example, they are all turned on or off, or to all turned to the same dim level, etc.

In the connected lighting system installed on floor 100, the reference numbers: 110-115, 120-129, 130, and 140 each correspond to a control zone. So for example, all luminaires in office 112 may be controlled together. Some rooms have more than one control zone. For example, the open plan office is partitioned into multiple control zones 120-129.

The connected lighting system is organized according to a hierarchical structure. The multiple occupancy sensors are at the first hierarchical level. The control zones are at the second hierarchical level. The control zones are partitioned into sets which are at the third hierarchical level. The sets at the third hierarchical level may correspond to a floor in the building, and control zones to areas in a floor of the building. The sets at the third hierarchical level may also correspond to another larger organizational feature, e.g., a wing of a building. If desired higher hierarchical levels may be introduced, e.g., a fourth hierarchical level may correspond to multiple floors, e.g., the entire building. Using a fourth hierarchical level allows detection of malfunction which only becomes apparent when comparing buildings between each other.

The controllers on which control of a control zone depends may be referred to as controllers corresponding to that control zone. Often controllers control only a single zone. In particular, this is normally the case for occupancy sensors, and light sensors. For example, control zone 115 comprises two occupancy sensors 161 and 162 and two luminaires. The hierarchical system is further explained below with reference to FIG. 3a.

An occupancy sensor detects the presence of humans in area around the occupancy sensor. Several technologies are available for occupancy sensors, e.g., passive infrared occupancy sensors, ultrasonic occupancy sensors, microwave occupancy sensors, audio detection occupancy sensors, etc. An occupancy sensor may be a motion sensor. An occupancy sensor may also be based on dongles carried by humans. Presence of the dongle may be detected wirelessly, e.g., by detecting an RFID in the dongle. The dongle may also be required to be entered into a dongle receptacle to indicate to the connected light system that humans are present. An example of the latter is the insertion of a (possibly personalized) smart card in a smart card receiver. Hybrid occupancy sensors combining two or more of these technologies are also possible.

Figure 2A:
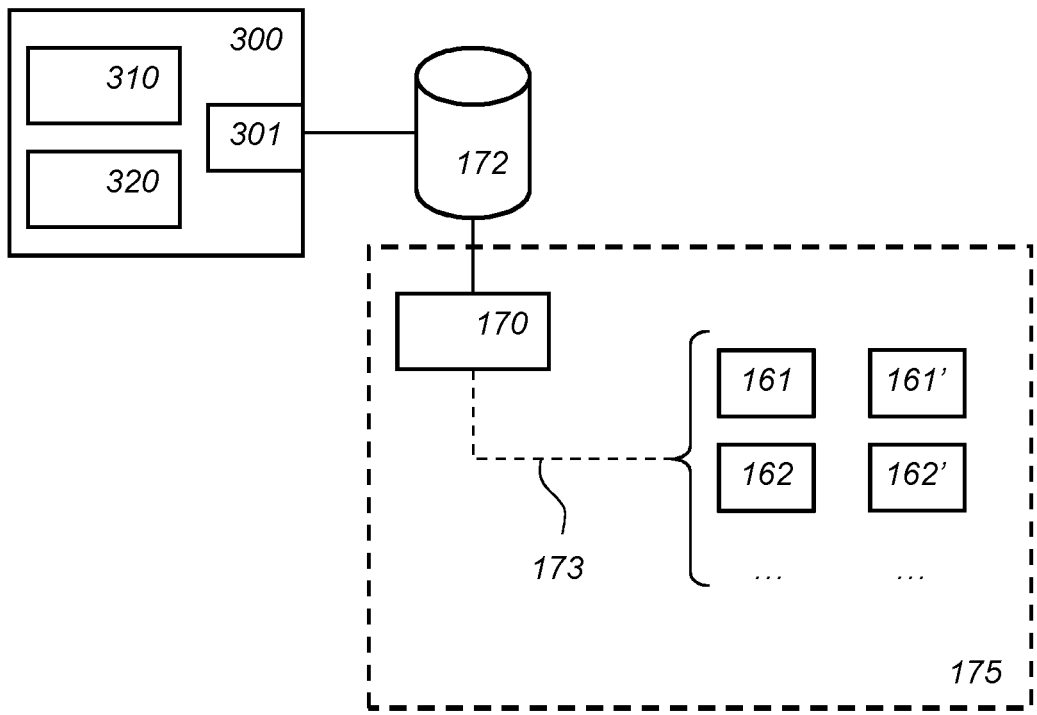

FIG. 2a schematically shows an example of an embodiment of a verification device 300 and a connected light system 175. Connected light system 175, which may be installed on floor 100. The lighting system may include controllers, such as wall switches, occupancy sensors, daylight sensors and the like. The lighting system may also include multiple luminaires. Light sensors preferably detect the presence of daylight, in particular sun light.

Shown is a back-end 170 for the connected light system. The back-end may be a central computer such as a building management system (BMS). The controllers and luminaires in the connected lighting system are connected to each other using a digital network 173. The digital network may be wired network, for example, an Ethernet network, or a Power over Ethernet (PoE) network. The digital network may be a wireless network, for example, a ZigBee network, a Wi-Fi, network, etc. Digital network 173 may be a hybrid of wired and wireless networks.

At the back-end information is received from controllers, such as occupancy sensors and wall switches. In particular, back-end 170 receives sensor data obtained from the multiple occupancy sensors. Sensors may include an occupancy sensor, light sensor, acoustic sensor, etc.

The amount of control exercised by back-end 170 may vary across embodiments. For example, in an embodiment, back-end 170 receives information from the controllers, and based on that information controls the luminaires, e.g., determines which luminaires should be activated, or dimmed etc. Alternatively, some or all controllers may also directly communicate to a luminaire, e.g., by sending a message over the digital network to a luminaire. For example, a wall switch may send a switching message to a luminaire directly. In this case the switching does not originate with back-end 170. These two approaches may be combined with some control being generated locally and some by the back-end 170. For example, back-end 170 may implement a central override, e.g., to turn off some or all lights, say at night, which may be implemented by sending an override message to all luminaires from back-end 170.

In an embodiment, back-end 170 obtains usage data of the multiple luminaires. For example, even if control is exercised locally, e.g., because controllers such as an occupancy sensor and/or a wall switch directly communicate to a luminaire, the luminaire sends a message to back-end 170 reporting on the usage state. For example, a usage message may be sent by a luminaire whenever its usage state changes and/or after a fixed time period. Back-end 170 may store the usage data in database 172. In FIG. 2a, database 172 is shown as separate from both verification device 300 and connected lighting system 175. For example, database 172 may be an online database, e.g., implemented as a cloud service. In an embodiment, database 172 is combined with connected lighting system 175, e.g., comprised in back-end 170. In an embodiment, database 172 is comprised in verification device 300. Database 172 may be implemented as, e.g., a relational database, for example using MySql. In an embodiment, database 172 is a file containing occupation sensor data, and optionally user data. For example, the file may be generated by back end 170. Occupancy sensors may report to back-end 170.

For example, usage data may be received at back-end 170 from a luminaire over the digital network. Usage data may also be obtained as control data which controls the behavior of a luminaire, e.g., generated by back-end 170 and sent over network 173 to the luminaire. Control data may include the on-or-off state of the luminaire, but may include additional information such as dimming level. Usage data may also be energy usage data. For example, luminaires may report energy use instead of reporting, say, dim state. Energy use may, e.g., be reported after fixed time intervals. Say every 5 minutes a luminaire may report its energy use over the past time interval.

In case usage level comprises dimming level or energy consumption of luminaires, aggregation unit 310 may convert the usage level to binary data. For example, any dimming level above 0, may be mapped to binary 1, while dimming level 0 may be mapped to binary 0. For example, any energy consumption may be mapped to binary 1, while no energy consumption may be mapped to binary 0. For most luminaires, any usage of luminaire ought to be correlated to occupation of the corresponding area. By increasing the usage level for low dimmed lights, it will be easier to detect luminaires that are switched on in a low state, even though they should not be switched on at all.

Figure 2B:
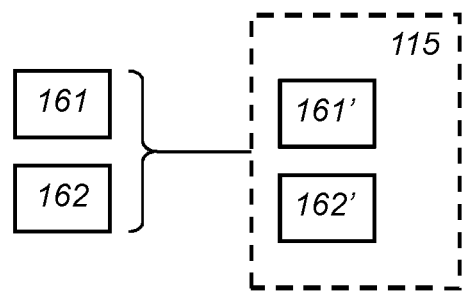

The mapping between sensors corresponding to a control zone and the luminaires in the control zone is referred to as the control mapping. This is illustrated in FIG. 2b for control zone 115. Shown are two occupancy sensors 161 and 162, that together control luminaires 161' and 162' in control zone 115. Referring to occupancy sensor 161 as S1 and occupancy sensor 162 as S2, then a common types of control mapping are the 'or' mapping. In this case, the luminaires in a control zone are turned on if the Boolean 'S1 or S2' detects occupancy. If S1 or S2 is true, the luminaires in meeting room 115 are turned on. An alternative control mapping is 'S1'. In this mapping S2 is ignored and S1 controls control zone 115 on its own. Especially in connected light systems with luminaires with integrated occupancy sensors, it is not uncommon if some of the occupancy sensors are ignored.

As a control example, luminaires in a control zone may be occupancy-controlled by one of the occupancy sensors in that control zone. As an example, in the map of FIG. 1, office space 130 on the top left has three occupancy sensors and the three luminaires are controlled by one of these sensors. Thus, in a control zone one or more luminaires may be turned on and off by a single controller or allocated to some more complicated control strategy. For example, a control mapping may include light sensors in addition to occupancy sensors.

FIG. 2a further shows a database 172. Back-end 170 is configured to store sensor data obtained from the multiple occupancy sensors and may also store usage data of the multiple luminaires. For example, back-end 170 may store sensor data for each sensor which indicates if an area covered by an occupancy sensor was occupied at a particular time. For example, back-end 170 may also store usage data for each luminaire which indicates if a luminaire was turned on at a particular time. Database 172 may, for example, keep the data for a period of time, say for a month, for 3 months etc.

FIG. 2a further shows a verification device 300 arranged to detect malfunction in the connected lighting system. For example, a sensor could malfunction and either under-report or over-report. For example, an occupancy sensor could inaccurately always report occupancy or always report no occupancy. In connected lighting systems, the users may never notice that lighting in some areas burn even if there is nobody there. On the other hand, if a sensor is broken, users may quickly get used to overriding the system using wall switches. This means that a faulty sensor, a bad configuration, a malfunctioning luminaire, etc., may potentially persist for a long time. Accordingly, automated means to find malfunction in a connected lighting system is desirable.

Verification device 300 comprises an input interface 301 arranged to connect to database 172. Verification device 300 further comprises:

an aggregation unit 310 arranged to compute occupancy values at different hierarchical levels by applying a statistical measure, and a processing unit 320 arranged to compare an occupancy value at a lower hierarchical level with an occupancy value at a higher hierarchical level, finding deviations that indicate a malfunction in the connected lighting system and producing a signal to communicate the malfunction.

Input interface 301 may, e.g., comprise a network interface arranged to connect to database 172. Input interface 301 may, e.g., be configured with an API to connect to the database. Input interface 301 may be a database interface arranged to connect to database 172. In an embodiment, the database may be queried through the database interface. Database 172 and verification device 300 may be implemented on the same device, e.g., on the same computer. In general, input interface 301 may take various forms, such as a network interface to a local or wide area network, e.g., the Internet, a storage interface to an internal or external data storage, etc.

Below examples are given of computing occupancy values and of using such occupancy values to detect malfunction.

Aggregation unit 310 may be arranged to apply a first statistical measure to sensor data obtained from occupancy sensors of the multiple occupancy sensors to obtain an occupancy value at the first hierarchical level.

As an example of sensor data, consider occupancy sensors that generate binary detection values every T seconds (e.g. 1 s or 60 s, etc.). This data is stored at database 172 and is available at verification device 300. From the sensor data, an occupancy per hour metric may be computed. For example, over an analysis period of nT seconds. The n binary values reported by an occupancy sensor may be added. Dividing the sum by the number of periods (e.g. sum/n), the average occupancy is computed. This value may be converted to occupancy hours per day, which is the measure used in most examples, e.g., by multiplying by 24.

Instead of taking the direct arithmetical mean of the binary sensor value, in an embodiment, a hold timer of H s is applied. That is, subsequent to a detection if the occupancy sensor does not report a detection within H s, it goes into unoccupied state (0); else, it results in an occupied state (1). This will smoothen the occupancy data, and avoid irregularities in the data, e.g., due, to areas in which people frequently walk in or out.

In a further embodiment, the computation is restricted to working days or to non-working days. This may improve the finding of malfunctioning of devices. For example, non-working days may have a very different usage patterns, e.g., in how many of the luminaires are turned on, e.g., because only security lighting is activated.

If desired, from the raw binary detection values, aggregation device 310 may obtain an occupancy state vector by applying said hold timer. Denote the occupancy state vector for sensor m by $s_m$. As an example, at sensor level, for sensor m, vector $s_m$ may be used to compute average occupancy in hours of that sensor. In an embodiment, first the occupancy state vector is computed, from which the occupancy value is then computed by applying the arithmetical mean and possibly converting to hours occupied per day. Also at higher hierarchical levels, an average occupancy use in hours may be computed using a corresponding occupancy state vector.

FIG. 1 illustrates occupancy value at the first level. Occupancy sensors in FIG. 1 have been colored with a gray tone that corresponds to the occupancy value; in the case of FIG. 1 occupancy values are indicated as average hours per day. As can be seen in the picture, some occupancy sensors are fully white, corresponding to an occupancy of 8 or less hours per day. For example, the office 130 shows three occupancy sensors which are at this level of occupancy. Meeting room 112, for example, show two occupancy sensors, one of which is at 8 or less hours per day, the other is at about 10 per day. FIG. 1 further illustrates occupancy value at the second level. Control zones in FIG. 1 have been colored with a gray tone that corresponds to the occupancy value of the control zone, as further explained herein.

In an embodiment, the aggregation unit is arranged to apply a statistical measure to usage data corresponding to luminaires of the multiple luminaires in a control zone in the connected lighting system to obtain an occupancy value at the second hierarchical level for the control zone.

For example, returning to meeting room 112 the two occupancy sensors do not report the same occupancy of the room. To detect malfunction, it is desired that the occupancy values at the first hierarchy in control zone 112, e.g., the occupancy values obtained from the occupancy sensors in meeting room 112 can be compared with the usage of room 112.

In different embodiments, at least two different ways are employed to obtain occupancy values for the second hierarchical level, e.g., for meeting room 112.

One option is that the connected lighting system is arranged to store usage data of the multiple luminaires in database 172. Input interface 301 of device 300 is arranged to obtain the usage data from database 172. This method has the advantage that the usage data corresponds to actual use of the luminaires in the various control zones.

Usage data may be obtained even if the control mapping is not known. For example, it may happen that the connected lighting system is installed by a different company than that supplies the verification device. The control mapping may be proprietary, but the verification device may still be able to obtain usage data of the luminaires, but not the control mapping. For example, the database 172 may be comprised in back-end 170, and back-end 170 provides an output interface, e.g., comprising a network interface, an API, or the like, to give verification device 300 access to the usage data.

Finally, in some embodiments the control mapping may be overridden by a user, e.g., through a wall switch, etc. This information may not be available to verification device 300, even though the usage information is.

A second option for aggregation unit 310 to obtain usage data is by computing it from the sensor data by applying a control mapping. This option is illustrated in FIG. 2c. Shown at references 221 and 222 are occupancy data reported by a first and second occupancy sensor corresponding to the same control zone. For example, the occupancy data could be reported from sensors 161 and 162 from meeting room 115. For example, occupancy data is reported every minute. A 1-bit indicates an occupied state. If the control mapping is for example the 'or' mapping, then occupancy for the control room may be computed by performing the Boolean or-function. This option is taken at reference 223. At reference 224, the 'only 222' option is shown. In the latter case, only the occupancy data of sensor 222 is used to control the control zone. The arrow in 224 points to a bit in which options 223 and 224 differ.

The control mapping that is used by verification device 300 to compute usage data, rather than receiving it from back-end 170 through database 172 may be the same as the control mapping used in the connected lighting system to control the control zone. Computed usage data is useful in finding malfunction and misconfiguration. If an identical control mapping is used, and the control functionality is working correctly, then the actual use of the luminaires will be the same as the computed usage.

FIG. 2c shows usage data 225 as reported by luminaires in the connected lighting system. For comparison the occupancy sensor data 221 and 222 have been repeated. Exemplifying usage data as reported by a luminaire in the corresponding control zone is shown at 225.

It may not always be possible to re-compute the usage data from the sensor data. For example, it may happen that the control mapping is not known to the verification device. For example, the connected lighting system may have been installed by a different vendor than the verification system. Even if the control mapping is known, not all inputs to the control mappings may be available to the verification device. For example, there may have been light sensors which overrule an occupancy sensor, if there is sufficient day light coming in so that artificial lighting is not needed. Another possibility, is that luminaires are overruled by wall switches. Finally, there may be a malfunction. For example, a broken luminaire may not turn on even if instructed to do so. As a result of factors such as these the actual usage of a luminaire may differ from the usage that verification device can deduce from sensor data.

This is illustrated at arrow 226: even though the occupancy sensors suggest that lighting is needed, based on occupancy, the usage 225 data shows that the luminaires were off. For example, at 227 the luminaire reports that it is on, even though the occupancy sensors suggest that this was not needed. In an embodiment, usage data is not binary but comprises dimming level. For example, dimming level may be expressed as a real number between 0 and 1, inclusive.

Once usage data has been obtained, aggregation unit 310 is arranged to apply a second statistical measure to the usage data corresponding to luminaires in a control zone to obtain an occupancy value at the second hierarchical level.

For example, aggregate unit 310 may compute an average percentage of the time the luminaires in a control zone were turned on. Possibly, the latter is converted to hours per day. For example, the usage data may show that the luminaires in control zone 125 were turned on, say, 11 hours of the time. Such information may be computed from usage data, both in case the usage was computed from occupancy sensors value using the control mapping or from usage obtained from the connected lighting system, e.g., through database 172. The average may be an arithmetical mean, etc. For example, consider a number m of luminaires in the same control zone, each n reporting binary usage data items, in some period. For example, the period may be a week, n may be 2000, and m may be 3, etc. By adding the mn data items and dividing by mn and average occupation for the control zone is obtained. This number may be converted to hours per day if desired.

As a further example for the control zone, in an embodiment, an occupancy state vector is computed as the occupancy state vector of the corresponding occupancy sensor level state vector(s); possibly after the occupancy sensor level state vector(s) were processed, e.g., with a hold timer.

At the first hierarchical level, e.g., sensor level, and at the second hierarchical level, e.g., control zone level, data such as occupancy sensor data or luminaire usage data can be obtained from which an occupancy value can directly be computed, e.g., by computing an average such as the arithmetical mean over a time period. The resulting mean may be converted to occupancy hours per day or the like.

For example, all occupancy and usage data in FIG. 2c show 18 time periods. A period may be, e.g., a minute, or more, say, 5 minutes, etc.

In occupancy sensor data 221, of the 18 cells, 8 are shown as occupied (1). This is an average occupation of 8/18, i.e., 0.44 or 44%. If the 18 cells are representative for an entire day, this is 0.44*24 hours=10.67 hours per day. For sensor data 222, 10 cells are occupied, which corresponds to 0.55, or 13.33 hours. The usage data 223, e.g., corresponding to one or more luminaires in the control zone that is controlled by the occupancy sensors corresponding to sensor data 221 and 222, the number is 11 cells out of 18, i.e., 0.61 or 14.67 hours. The usage data 224, e.g., corresponding to one or more luminaires in the control zone that is controlled by the occupancy sensor corresponding to sensor data 222, the number is 10 cells out of 18, i.e., 0.55, or 13.33 hours. Finally, usage data 225 has 12 cells occupied, e.g., a luminaire set to on, which means 0.67, or 16 hours.

In practice, a much larger set of occupancy data may be used. For example, a first level occupancy value may be computed from 2000 or more occupancy sensors data items. For example, a second level occupancy value may be computed from 2000 or more usage data items.

The aggregation unit may also be arranged to obtain an occupancy value for a set of the third or higher hierarchical level, e.g., by apply a statistical measure to the occupancy values of the hierarchical level immediately below the particular hierarchical level. In an embodiment, a statistical measure used for the third or higher differs from the one used for the first and/or second hierarchical level. For example, FIG. 2d shows occupancy values 230 obtained for control zones. These occupancy values are expressed, in this example, as hours per day. All these occupancy values are obtained for control zones in the same set of the third hierarchical level. For example, these occupancy values of the second level may be obtained for control zones on the same floor or in the same wing of a building. In an embodiment, a third or higher level hierarchical level is obtained from all occupancy values of the hierarchical level immediately below the particular hierarchical level.

Shown in FIG. 2d are 9 occupancy value of the second hierarchical level. For example, these occupancy values may correspond to a floor or wing in a building with 9 control zones. The statistical measure may be a so called statistical measure of central tendency. Examples of statistical measures of central tendency are the median and the (arithmetical) mean. For example, in an embodiment the third level occupancy value for FIG. 2d may be obtained as the mean of the numbers, which is 9.88 in FIG. 2d; For example, in an embodiment the third level occupancy value for FIG. 2d may be obtained as the median of the numbers, which is 9.4 in FIG. 2d. Other statistical measures of central tendency include, e.g., the geometric mean, quadratic mean, logarithmic mean (e.g., as defined in the paper 'Logarithmic mean for several arguments', by Seppo Mustonen), etc.

Figure 3A:
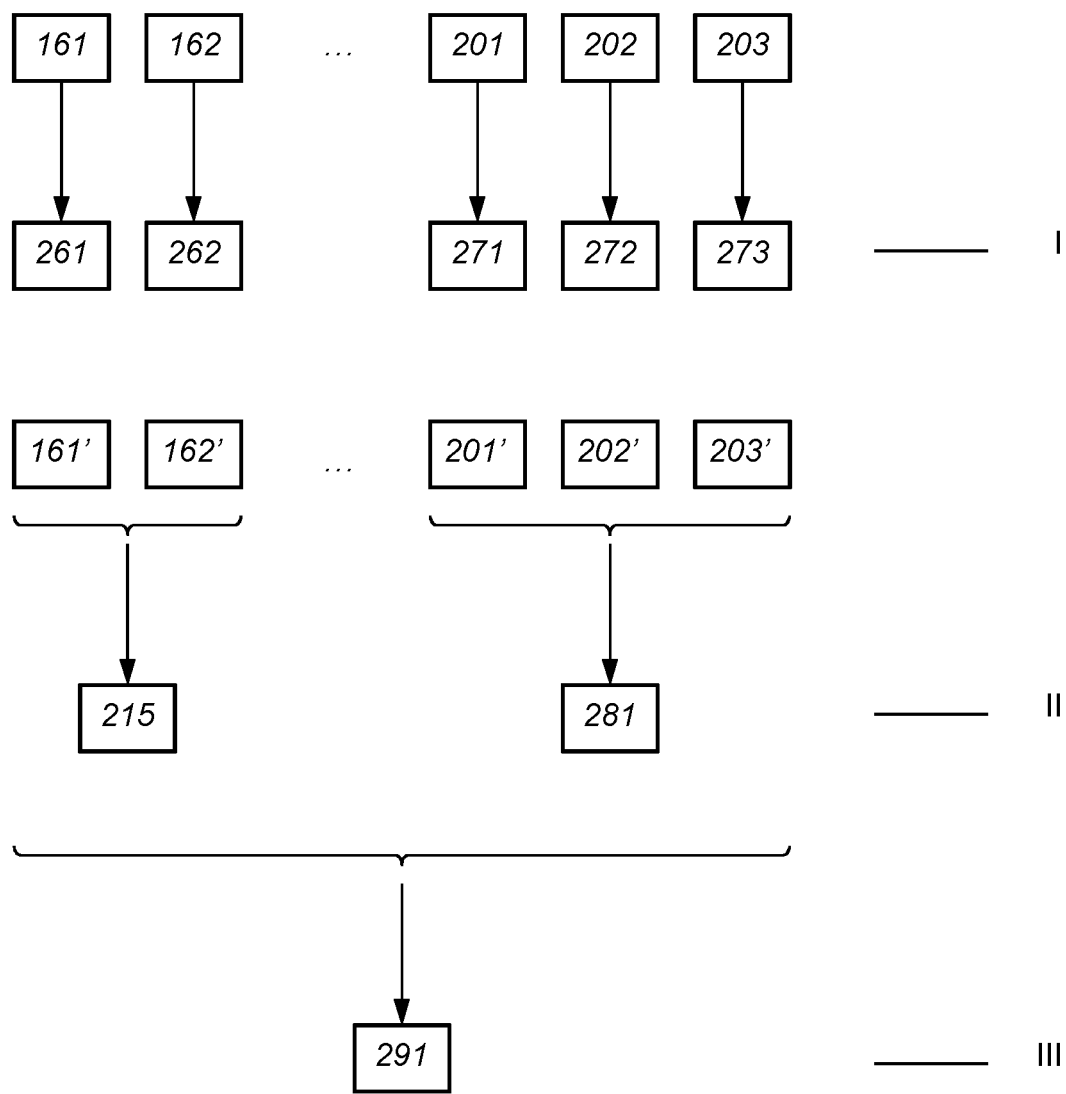

FIG. 3a illustrates in a schematic way a possible way to compute occupation values for different hierarchical levels.

Computing an occupancy value at the first hierarchical level is first illustrated in FIG. 3a. Shown in FIG. 3a are occupancy sensors 161, 162, up to occupancy sensors 201, 202, and 203. From the sensor data obtained from these sensors occupancy values are computed, e.g., number of occupied hours per day. Shown are occupancy values 261, 261, 271, 272 and 273; This data is marked with a roman numeral I.

Below the computation of the first hierarchical level occupancy values are shown the luminaires 161', 162', up to luminaires 201', 202', and 203'. The luminaires are partitioned into multiple control zones; shown in this case are two control zones are shown: a first control zone comprising luminaires 161', 162', and a second control zone comprising luminaires 201', 202', and 203'.

In this case, usage data is received from all of the luminaires. The data is aggregated and, e.g., averaged to obtain second level occupancy values; shown are occupancy value 215 for the first control zone, and occupancy value 281 for the second control zone. This data is marked with a roman numeral II.

The second level occupancy values are processed to obtain a third level occupancy level. For example, a statistical measure such as a median or mean may be applied. In this case, a single third level occupancy value is obtained: occupancy value 291. This data is marked with a roman numeral III. In an embodiment, there may be multiple third level occupancy values. These may be further processed to obtain higher level occupancy levels, such a fourth level.

Figure 3B:
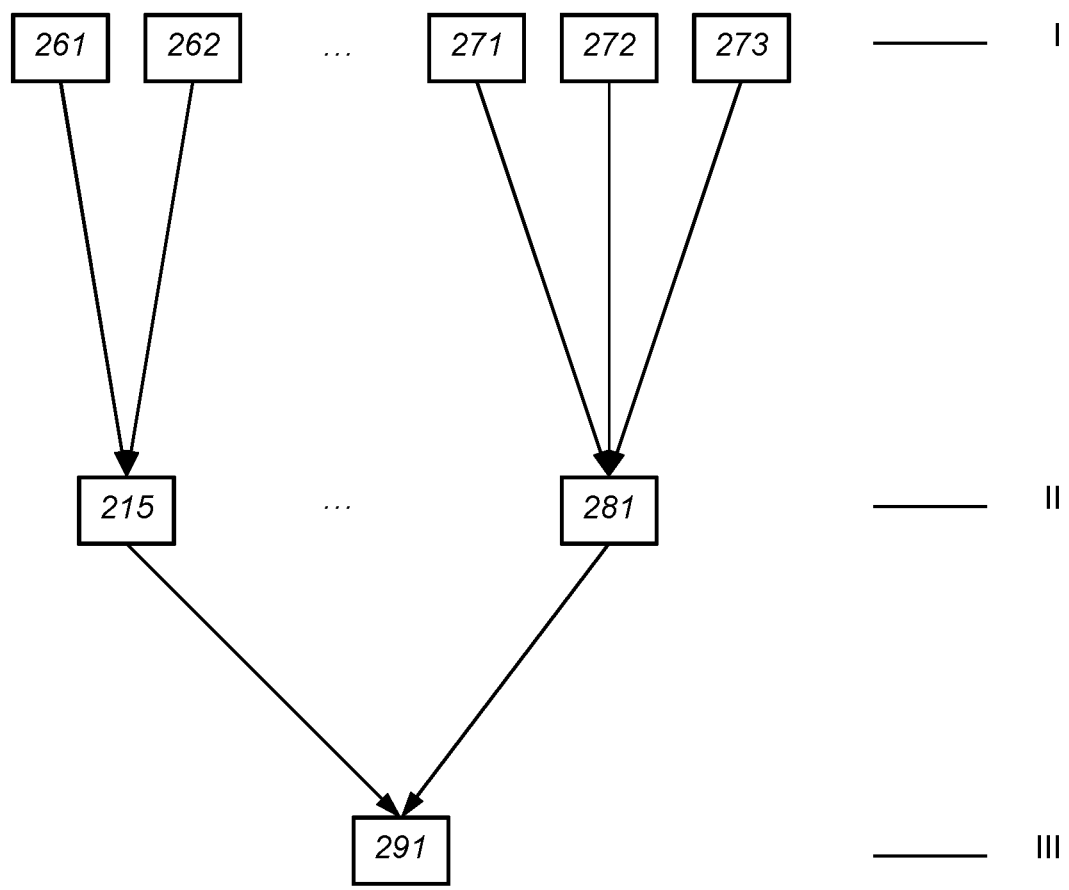

FIG. 3b further illustrates the hierarchical nature of the occupancy levels. Shown in FIG. 3b is a tree in which each occupancy level corresponds to one occupancy level of which the level is one higher, i.e., the level immediately above. For example, first level occupancy values 261 and 262 correspond to the second level occupancy value 215. Second level occupancy values 215 and 281 correspond to the third level occupancy value 291.

If desired, the occupancy values may be visualized in several ways. For example, in an embodiment, the verification device may comprise a visualization unit arranged to generate a display comprising a map of control zones and sensors that correspond to the same set at the third hierarchical level. FIG. 1 shows an example map for floor 100. In the map colors for control zones indicate occupancy levels for the second hierarchical level. In the map, symbols indicate occupancy sensors, in this case small rectangles. The occupancy sensor symbols are colored with a color that indicates the occupancy sensor for that occupancy sensor. In an embodiment, the visualization unit is arranged to select a color key 150 for the map so that a central color of the color map corresponds to the occupancy level of the third hierarchical level. In this way, colors of the map indicate a deviation of the occupancy values for the control zones and occupancy sensor and the third level hierarchical occupancy value. A user can quickly see, which control zones and occupancy sensors report an occupation above or below the occupation value of the third level, e.g., of the floor.

In the example of FIG. 1 a gray scale color map has been used. A central gray value of color scale 150 corresponds to the third hierarchical level. In an embodiment, different intensities of gray are used to indicate different occupation levels. In an embodiment, a color scale is used with a different color for occupation values above the third level occupancy value. For example, the third level occupancy value may correspond to white. For occupation values above the third level occupancy value, an increasing intensity of red is used. Whereas for occupation values below the third level occupancy value, an increasing intensity of blue is used. Instead of blue and red other colors may be used.

In an advantageous embodiment, the occupancy hours of different regions are segmented as positive and negative deviations with respect to an average and displayed in different colors. Thus an average occupancy hour band may be displayed in white color. For different control zones and occupancy sensors, occupancy hours for a business day are computed. Deviations exceeding the average floor occupancy hour are shown in red gradients, and deviations below the average floor occupancy hour are shown in blue gradients.

For example, from the map in FIG. 1 it can be seen that occupancy use of large portions of the open office are very close to average floor use (e.g. control zones, 128, 127, 125, 121 and 122). It can also be seen that meeting rooms 114 and 115 are under-utilized compared to the other meeting rooms. Office 130 is under-utilized compared to the overall floor.

These observations may be made efficiently on account of the proposed data processing and visualization system. An application analyst may easily determine whether performance at a specific displayed hierarchical level is acceptable, determine regions that need further analysis and can navigate further to the corresponding hierarchical levels accordingly.

In an embodiment, the processing unit is arranged to find an occupancy value at a lower hierarchical level and an occupancy value at a higher hierarchical level that deviate more than a threshold. For example, it can be seen from FIG. 1 that meeting room 110 has a large deviation compared to the overall floor, indicating possible faults. Sensor occupancy of occupancy sensor 161 in meeting rooms 110 and 115 is inconsistent with the corresponding control zone occupancy.

In general, when the processing unit is arranged to find a first and second occupancy values that differ, e.g. above or below each other, this may be implemented by introducing a threshold, so that the first and second occupancy values differ more than the threshold. In general, when the processing unit is arranged to find a first occupancy values at a second occupancy level, this means that the first and second occupancy level are about equal. This may be implemented by introducing a threshold, so that the first and second occupancy values differ less than the threshold. The threshold may be an absolute threshold, say, 1 hour. The threshold may also be relative, say 10% of the first occupancy level. The threshold may also be a combination of an absolute and relative threshold. For example, the threshold may be the maximum of 1 hour and 10% of the first occupancy level. For example, the threshold may be the maximum of 1 hour, 10% of the first occupancy level, and 10% of the second occupancy level, etc.

As will be explained, the processing device may be programmed with one or more different rules that identify problematic areas, e.g., control zones. As the rules grow more detailed, it becomes ever more likely that there is an actual problem in the connected lighting system. On the other hand, as a rule is more general, there is a higher chance of false positives. For example, during, say, a yearly maintenance round, areas may be investigated that are identified by a broad rule. There is a good chance that problematic areas are included in this selection, as the rule will include many areas. On the other hand, the verification device may be arranged to generate a signal, say an alarm, whenever a more specific rule recognizes a problem. In this case, such an area may be investigated also outside of scheduled maintenance. As the latter costs are higher, it is an advantage that the chance of a false positive is lower. As indicated above there are many factors that may influence usage data, some of which may be outside the control of the verification device, thus there is also a remaining residual chance that the observed data indeed correspond to the actual use rather than being due to a malfunction or the like.

In an embodiment, verification device 300 comprises a rule database comprising deviation patterns, the processing unit finding patterns in the occupancy values satisfying a rule in the rule database. Below a number of example rules are discussed. These rules could be comprised in said rule database, but may also, alone or apart, be implemented in verification device 300. For example, verification device 300 may be arranged to periodically try the rules in the database, say once a week.

In an embodiment, the processing unit is arranged to find a control zone with multiple corresponding sensors, e.g. referred to as S1, S2, such that the occupancy value for the control zone is above the occupancy value at the third hierarchical level corresponding to the control zone, and a first of the sensors (S1) is at the occupancy value at the third hierarchical level and a second sensor is at or above the occupancy value for the control zone, the processing unit producing a signal that the second one of the sensors (S2) is malfunctioning.

For example, consider meeting room 110. This is a control zone with two occupancy sensors 163 and 164. The occupancy value for the control zone is well above the occupancy value at the third hierarchical level corresponding to floor in which meeting room 110 lies. In this case, the occupancy value for meeting room 110 is well over 30% above floor average. The occupancy level for occupancy sensor 164, e.g., the first occupancy sensor, is at, e.g., within a threshold of, the occupancy value of the floor. In this case, the occupancy value of occupancy sensor 164 is within about 10% of the floor occupancy value. Occupancy sensor 163, e.g., a second occupancy sensor, is at the occupancy value for the control zone.

In this case, processing unit 320 may conclude that there may be something wrong with occupancy sensor 163. Processing unit 320 may produce a signal that the occupancy sensor 163 is malfunctioning. In general, producing a signal may be done by generating an email, an SMS, a pop-up screen, etc., to alert an operator of connected lighting system of the problem.

In room 110, sensor 164 is in agreement with the use of the floor. This suggests that sensor 164 is reporting a reasonable value. On the other hand, both control room 110 and sensor 163 report a value that is far out of average. This suggests that sensor 163 may be wrong.

In room 110 one of the occupancy sensors is likely wrong, but another sensor is available in the same control zone. Sensor 164 may or may not be included in the control mapping. Verification device may repair the problem in room 110 by changing the control mapping for control zone 110 to exclude the sensor 163. For example, if the control mapping consists of (or comprises) the mapping 'sensor 163 OR sensor 164', or the mapping 'sensor 163', then (this part of) the mapping may be changed to 'sensor 164' for both cases. This will bring the occupancy value of room 110 back in line with average occupancy. Note that it can be concluded on the basis of the data that the control mapping is very likely not 'sensor 164', as this is not consistent with the high second level occupancy.

The use of other controllers, e.g., light sensors, wall switches, etc., need not be affected and can be retained in the control mapping. For example, suppose the control mapping is to turn on the light if '(NOT light sensor) and (sensor 163 OR sensor 164)' this may be changed to '(NOT light sensor) and (sensor 164)'. In this case, the light sensor reports true if the day light level is sufficient without additional artificial lighting.

In an embodiment, the processing unit is arranged to find a control zone with multiple corresponding sensors (S1, S2), such that the occupancy value for the control zone is at or below the occupancy value at the third hierarchical level corresponding to the control zone, and a first one of the multiple sensors (S1) is at the occupancy value for the control zone and a second sensor (S2) is above the occupancy value for the control zone, the processing unit producing a signal that the second one of the sensors (S2) is malfunctioning.

For example, consider meeting room 115. The occupancy value for control zone 115 is at or below the occupancy value of floor 110. Occupancy sensor 162, e.g., a first sensor, is at the occupancy value for control zone 115. Occupancy sensor 161 is above the occupancy value for control zone 115. As before, processing unit 320 may produce a signal that the second one of the sensors 161 (S2) is malfunctioning. In this case, there is no need to change the control mapping as the occupancy value of control room 115 is much closer to floor occupancy than second sensor 161 is.

In an embodiment, the processing unit is arranged to find a control zone wherein all occupancy values are below the occupancy value of the corresponding third hierarchical level. In an embodiment, aggregation unit 310 is arranged to obtain wall switches information, and processing unit 320 is arranged to find a control zone wherein all occupancy values are below the occupancy value of the corresponding third hierarchical level, and wherein use of wall switches is higher than floor average. In this case both occupancy sensors may be malfunctioning. The occupancy sensors may also be located at a position where occupancy detection is less than idea, causing the users of the room to make frequent use of wall switches.

Typically, the devices 300 and 170 each comprise a microprocessor (not separately shown) which executes appropriate software stored at the devices 300 and 170; for example, that software may have been downloaded and/or stored in a corresponding memory, e.g., a volatile memory such as RAM or a non-volatile memory such as Flash (not separately shown). Alternatively, the devices 300 and 170 may, in whole or in part, be implemented in programmable logic, e.g., as field-programmable gate array (FPGA). Devices 300 and 170 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, device 300 comprises an aggregation circuit, processing circuit, and/or a visualization circuit. The visualization circuit may comprise a display, e.g., a display unit, and/or may comprise a display interface arranged for connecting to a display, etc. The circuits implement the corresponding units described herein. The circuits may be a processor circuit and storage circuit, the processor circuit executing instructions represented electronically in the storage circuits. The circuits may also be, FPGA, ASIC or the like.

Figure 4:
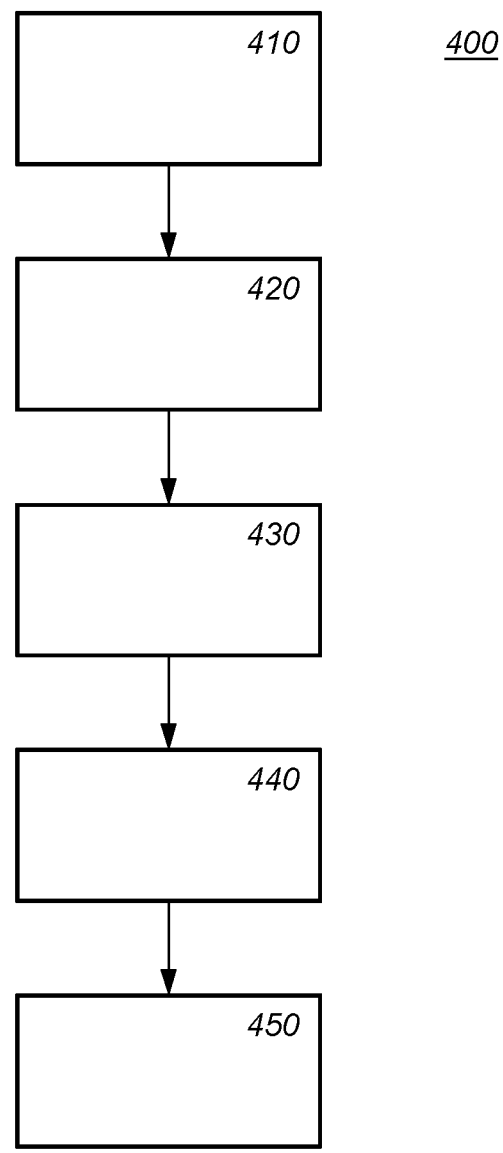

FIG. 4 illustrates an embodiment of a method 400 of verification. Method 400 comprises:
obtaining 410 the sensor data obtained from the multiple occupancy sensors,
computing 420 occupancy values which are indicative of occupancy over a specified time period at different hierarchical levels by applying a statistical measure,
comparing 430 an occupancy value at a lower hierarchical level with an occupancy value at a higher hierarchical level,
finding 440 deviations that indicate a malfunction in the connected lighting system, and
producing 450 a signal to communicate the malfunction.
Method 400 may comprise additional elements as set out herein.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 410, 420 and 430 may be executed, at least partially, in parallel. Moreover, a given step may not have finished completely before a next step is started.

A method according to the invention may be executed using software, which comprises instructions for causing a processor system to perform method 400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 5A:
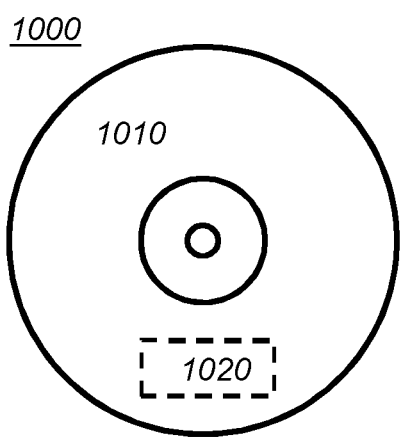

FIG. 5a shows a computer readable medium 1000 having a writable part 1010 comprising a computer program 1020, the computer program 1020 comprising instructions for causing a processor system to perform a method of verification, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of verification.

Figure 5B:
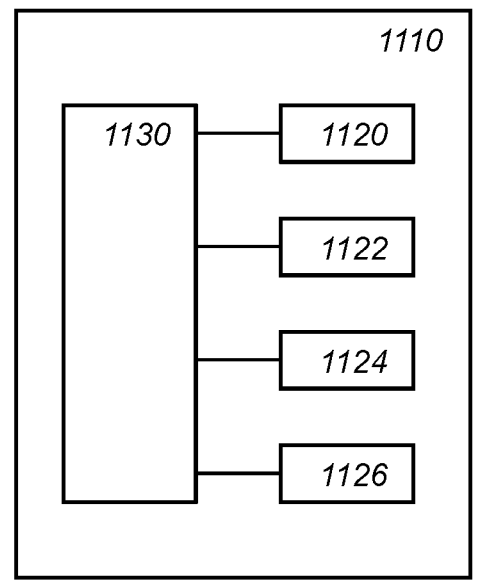

FIG. 5b shows in a schematic representation of a processor system 1140 according to an embodiment. The processor system comprises one or more integrated circuits 1110. The architecture of the one or more integrated circuits 1110 is schematically shown in FIG. 5b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the verification device may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software. The software comprises:

aggregation instructions arranged to compute occupancy values which are indicative of occupancy over a specified time period at different hierarchical levels by applying a statistical measure, and processing instructions arranged to compare an occupancy value at a lower hierarchical level with an occupancy value at a higher hierarchical level, finding deviations that indicate a malfunction in the connected lighting system and producing a signal to communicate the malfunction.

For example, in an embodiment a verification device is provided that comprises:

an input interface (301) arranged to connect to a database and obtain the sensor data obtained from the multiple occupancy sensors, a processor circuit and a memory circuit, the processor being arranged to execute software stored in the memory circuit, the software comprising:

aggregation instructions arranged to compute occupancy values which are indicative of occupancy over a specified time period at different hierarchical levels by applying a statistical measure, and processing instructions arranged to compare an occupancy value at a lower hierarchical level with an occupancy value at a higher hierarchical level, finding deviations that indicate a malfunction in the connected lighting system and producing a signal to communicate the malfunction.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. A verification device to detect malfunction in a connected lighting system, the connected lighting system comprising multiple luminaires and multiple occupancy sensors, the multiple luminaires being partitioned into control zones which are controlled in dependency on one or more corresponding occupancy sensors, the connected lighting system being organized according to a hierarchical structure wherein the multiple occupancy sensors are at a first hierarchical level, the control zones are at a second hierarchical level, the multiple occupancy sensors at the first hierarchical level corresponding to control zones at the second hierarchical level, the control zones being partitioned into sets which are at a third hierarchical level, the connected lighting system being connected to a database and arranged to store sensor data obtained from the multiple occupancy sensors, the verification device comprising:

an input interface arranged to connect to the database and obtain the sensor data obtained from the multiple occupancy sensors, an aggregation unit arranged to compute occupancy values which are indicative of average occupancy over a specified time period at different hierarchical levels by applying a statistical measure, an occupancy value at the first hierarchical level indicating an occupancy value of an occupancy sensor, an occupancy value at the second hierarchical level indicating of an occupancy value of a control zone, and an occupancy value at the third hierarchical level indicating an occupancy value of a set of control zones, and a processing unit arranged to compare an occupancy value at a lower hierarchical level with a corresponding occupancy value at a higher hierarchical level, finding deviations between said occupancy value at the lower hierarchical level and said corresponding occupancy value at the higher hierarchical that are greater than a threshold and that indicate a malfunction in the connected lighting system and producing a signal to communicate the malfunction.

2. A verification device as in claim 1, wherein the multiple luminaires and multiple occupancy sensors are installed in a building, so that the sets at the third hierarchical level correspond to floors in the building, and control zones correspond to areas in a floor of the building.

3. A verification device as in claim 1, wherein the aggregation unit is arranged to apply a statistical measure to sensor data obtained from occupancy sensors of the multiple occupancy sensors to obtain an occupancy value at the first hierarchical level.

4. A verification device as in claim 1, wherein the aggregation unit is arranged to apply a statistical measure to usage data corresponding to luminaires of the multiple luminaires in a control zone in the connected lighting system to obtain an occupancy value at the second hierarchical level for the control zone, wherein the connected lighting system is arranged to store usage data of the multiple luminaires, the input interface being arranged to obtain the usage data, or the aggregation unit is arranged to compute the usage data by applying a control mapping to the sensor data.

5. A verification device as in claim 1, wherein the aggregation unit is arranged to obtain an occupancy value for a set of the third or higher hierarchical level, by apply a statistical measure to the occupancy values of the hierarchical level immediately below the particular hierarchical level.

6. A verification device as in claim 1, wherein the processing unit is arranged to find an occupancy value at a lower hierarchical level and an occupancy value at a higher hierarchical level that deviate greater than a threshold.

7. A verification device as in claim 1, the processing unit being arranged to find a control zone with multiple corresponding occupancy sensors, such that the occupancy value for the control zone is above the occupancy value at the third hierarchical level corresponding to the control zone, and a first of the occupancy sensors is at the occupancy value at the third hierarchical level and a second occupancy sensor is at or above the occupancy value for the control zone, the processing unit producing a signal that the second one of the occupancy sensors is malfunctioning.

8. A verification device as in claim 7, wherein the processing unit changes a control mapping between the control zones and the corresponding occupancy sensors to exclude the second occupancy sensor.

9. A verification device as in claim 1, the processing unit being arranged to find a control zone with multiple corresponding occupancy sensors, such that
the occupancy value for the control zone is at or below the occupancy value at the third hierarchical level corresponding to the control zone, and
a first one of the multiple occupancy sensors is at the occupancy value for the control zone and a second occupancy sensor is above the occupancy value for the control zone, the processing unit producing a signal that the second one of the occupancy sensors is malfunctioning.

10. A verification device as in claim 1, wherein the processing unit is arranged to find a control zone wherein all central sensors values are below the central control zone value.

11. A verification device as in claim 1 further comprising a rule database comprising deviation patterns, the processing unit finding patterns in the occupancy values satisfying a rule in the rule database.

12. A verification device as in claim 1 further comprising:
a visualization unit arranged to generate a display comprising a map of control zones and occupancy sensors that correspond to the same set at the third hierarchical level, colors of the map indicate a deviation of the occupancy values for the control zones and occupancy sensor and the third level hierarchical occupancy value.

13. A connected lighting system comprising a verification device, multiple luminaires, and multiple occupancy sensors, the multiple luminaires being partitioned into control zones which are controlled in dependency on one or more corresponding occupancy sensors, the connected lighting system being organized according to a hierarchical structure wherein the multiple occupancy sensors are at a first hierarchical level, the control zones are at a second hierarchical level, the control zones being partitioned into sets which are at a third hierarchical level, the connected lighting system being connected to a database and being arranged to store sensor data obtained from the multiple occupancy sensors and usage data of the multiple luminaires in the database, the verification device comprising:
an input interface arranged to connect to the database and obtain the sensor data obtained from the multiple occupancy sensors,
an aggregation unit arranged to compute occupancy values which are indicative of average occupancy over a specified time period at different hierarchical levels by applying a statistical measure, an occupancy value at the first hierarchical level indicating an occupancy value of an occupancy sensor, an occupancy value at the second hierarchical level indicating of an occupancy value of a control zone, and an occupancy value at the third hierarchical level indicating an occupancy value of a set of control zones, and
a processing unit arranged to compare an occupancy value at a lower hierarchical level with a corresponding occupancy value at a higher hierarchical level, finding deviations between said occupancy value at the lower hierarchical level and said corresponding occupancy value at the higher hierarchical that are greater than a threshold and that indicate a malfunction in the connected lighting system and producing a signal to communicate the malfunction.

14. A verification method to detect malfunction in a connected lighting system, the connected lighting system comprising multiple luminaires and multiple occupancy sensors, the multiple luminaires being partitioned into control zones which are controlled in dependency on one or more corresponding occupancy sensors, the connected lighting system being organized according to a hierarchical structure wherein the multiple occupancy sensors are at a first hierarchical level, the control zones are at a second hierarchical level, the multiple occupancy sensors at the first hierarchical level corresponding to control zones at the second hierarchical level, the control zones being partitioned into sets which are at a third hierarchical level, the connected lighting system being connected to a database and is arranged to store sensor data obtained from the multiple occupancy sensors of the multiple luminaires, the verification method comprising:
an input interface of a verification device in the connected lighting system connecting to the database and obtaining the sensor data obtained from the multiple occupancy sensors,
computing occupancy values which are indicative of average occupancy over a specified time period at different hierarchical levels by applying a statistical measure, an occupancy value at the first hierarchical level indicating an occupancy value of an occupancy sensor, an occupancy value at the second hierarchical level indicating of an occupancy value of a control zone, and an occupancy value at the third hierarchical level indicating an occupancy value of a set of control zones, and
comparing an occupancy value at a lower hierarchical level with an occupancy value at a corresponding higher hierarchical level, finding deviations between said occupancy value at the lower hierarchical level and said corresponding occupancy value at the higher hierarchical level that are greater than a threshold and that indicate a malfunction in the connected lighting system and producing a signal to communicate the malfunction.

15. A non-transitory computer-readable medium comprising computer program instructions arranged to detect malfunction in a connected lighting system, the connected lighting system comprising multiple luminaires and multiple occupancy sensors, the multiple luminaires being partitioned into control zones which are controlled in dependency on one or more corresponding occupancy sensors, the connected lighting system being organized according to a hierarchical structure wherein the multiple occupancy sensors are at a first hierarchical level, the control zones are at a second hierarchical level, the multiple occupancy sensors at the first hierarchical level corresponding to control zones at the second hierarchical level, the control zones being partitioned into sets which are at a third hierarchical level, the connected lighting system being connected to a database and being arranged to store sensor data obtained from the multiple occupancy sensors of the multiple luminaires, the instructions comprising:
connecting an input interface of a verification device in the connected lighting system to the database and obtaining the sensor data obtained from the multiple occupancy sensors,
computing occupancy values which are indicative of average occupancy over a specified time period at different hierarchical levels by applying a statistical measure, an occupancy value at the first hierarchical level indicating an occupancy value of an occupancy sensor, an occupancy value at the second hierarchical level indicating of an occupancy value of a control zone, and an occupancy value at the third hierarchical level indicating an occupancy value of a set of control zones, and comparing an occupancy value at a lower hierarchical level with an occupancy value at a corresponding higher hierarchical level, finding deviations between said occupancy value at the lower hierarchical level and said corresponding occupancy value at the higher hierarchical that are greater than a threshold and that indicate a malfunction in the connected lighting system and producing a signal to communicate the malfunction.

* * * * *